United States Patent
Hu et al.

(10) Patent No.: US 10,209,395 B2
(45) Date of Patent: Feb. 19, 2019

(54) FORMATION INDEPENDENT CEMENT EVALUATION WITH ACTIVE GAMMA RAY DETECTION

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/554,859

(22) PCT Filed: Apr. 21, 2015

(86) PCT No.: PCT/US2015/026800
§ 371 (c)(1),
(2) Date: Aug. 31, 2017

(87) PCT Pub. No.: WO2016/171668
PCT Pub. Date: Oct. 27, 2016

(65) Prior Publication Data
US 2018/0038990 A1  Feb. 8, 2018

(51) Int. Cl.
*G01V 5/12* (2006.01)
*E21B 47/00* (2012.01)
*E21B 47/08* (2012.01)
*E21B 33/14* (2006.01)

(52) U.S. Cl.
CPC .......... *G01V 5/125* (2013.01); *E21B 47/0005* (2013.01); *E21B 47/082* (2013.01); *G01V 5/12* (2013.01); *E21B 33/14* (2013.01)

(58) Field of Classification Search
CPC ...... G01V 5/125; E21B 47/0005; E21B 33/14
USPC ........................................ 250/269.3
See application file for complete search history.

(56) References Cited

U.S. PATENT DOCUMENTS

| 4,939,361 A | 7/1990 | Smith, Jr. et al. |
| 2011/0284732 A1 | 11/2011 | Korkin et al. |

OTHER PUBLICATIONS

"International Application Serial No. PCT/US2015/026800, International Search Report dated Dec. 16, 2015", 3 pgs.
"International Application Serial No. PCT/US2015/026800, Written Opinion dated Dec. 16, 2015", 10 pgs.

*Primary Examiner* — David Porta
*Assistant Examiner* — Gisselle Gutierrez
(74) *Attorney, Agent, or Firm* — Gilliam IP PLLC

(57) ABSTRACT

A method for cement evaluation may include generating a gamma ray, from a radioactive source, into cement disposed between a casing and a geological formation. Photons reflected from the geological formation and the cement are detected on a gamma detector having a collimator. A detector-to-source distance, a collimator angle, and/or a collimator diameter are set to provide an energy spectra independent of the geological formation. The quality of the cement may be determined based on the energy spectra of the detected photons.

19 Claims, 9 Drawing Sheets

US 10,209,395 B2

FORMATION INDEPENDENT CEMENT EVALUATION WITH ACTIVE GAMMA RAY DETECTION

BACKGROUND

Natural resources such as gas, oil, and water residing in a geological formation may be recovered by drilling a wellbore into the formation. A string of pipe (e.g., casing) is run into the wellbore in order to provide structural support for the wellbore sides. The casing may be metal (e.g., steel).

Primary cementing may be performed whereby a cement slurry is injected into the annulus between the casing and the geological formation. The cement is permitted to set into a hard mass (i.e., a sheath) to thereby support the string of pipe within the wellbore and seal the annulus. Due to the tightly coupled nature of the formation, sheath, and casing, it may be difficult to evaluate the cured cement.

DETAILED DESCRIPTION

Some of the challenges noted above, as well as others, can be addressed by implementing the apparatus, systems, and methods described herein. In many examples, a logging tool may be designed having a radioactive source and detector with a collimator in which a detector-to-source distance and a detector collimator geometry are set to provide downhole cement evaluation that is substantially independent of geological formation properties (e.g., porosity independent, density independent).

Figure 1:
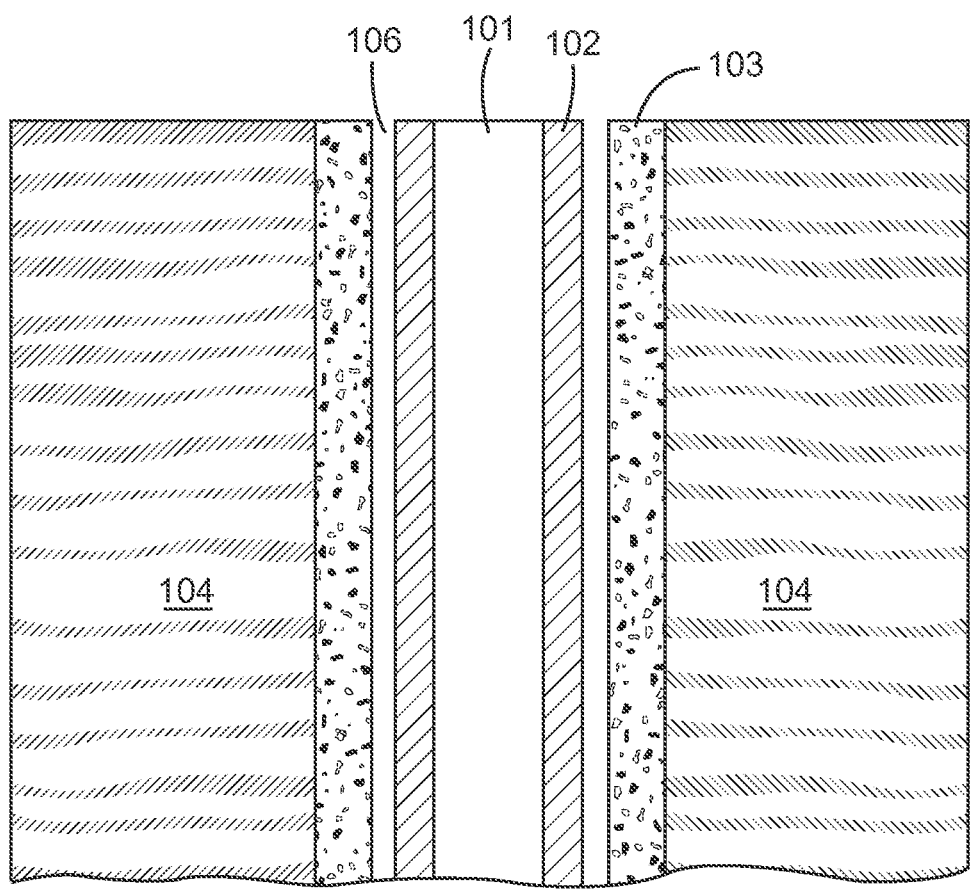
FIG. 1 is a cross-sectional diagram of a cased borehole in a geological formation, according to various examples of the disclosure.

FIG. 1 is a cross-sectional diagram of a cased borehole 101 in a geological formation 104, according to various examples of the disclosure. The borehole 101 is lined with the casing 102 that may comprise a metal (e.g., steel). Cement 103 is injected into the borehole 101 such that, after it reaches the bottom of the borehole, it returns upward in the annulus region between the casing 102 and the formation 104. Thus, the cement stabilizes the casing 102 within the borehole 101. A gap 106 may be present between the casing 102 and the cement 103.

Due to possible imperfections introduced into the cement 103 during construction and/or subsequent wear damage caused by use of the borehole, it is often desirable to perform non-destructive testing of the cement. Using a logging tool having a radioactive source, detector and detector collimator in the borehole, possible gaps or bubbles in the cement or gaps 106 between the casing 102 and the cement 103, as well as other imperfections in the cement, may be discovered. Various examples may be used to detect the presence of these imperfections.

The porosity of the geological formation 104 may vary for different boreholes 101. As used herein, porosity may be defined as a percentage of pore space in a unit volume of rock and is indicated by a porosity unit (pu) having a range of 0-100 pu. For example, porosity=pore volume/total volume where 1 pu=1% porosity.

Figure 2:
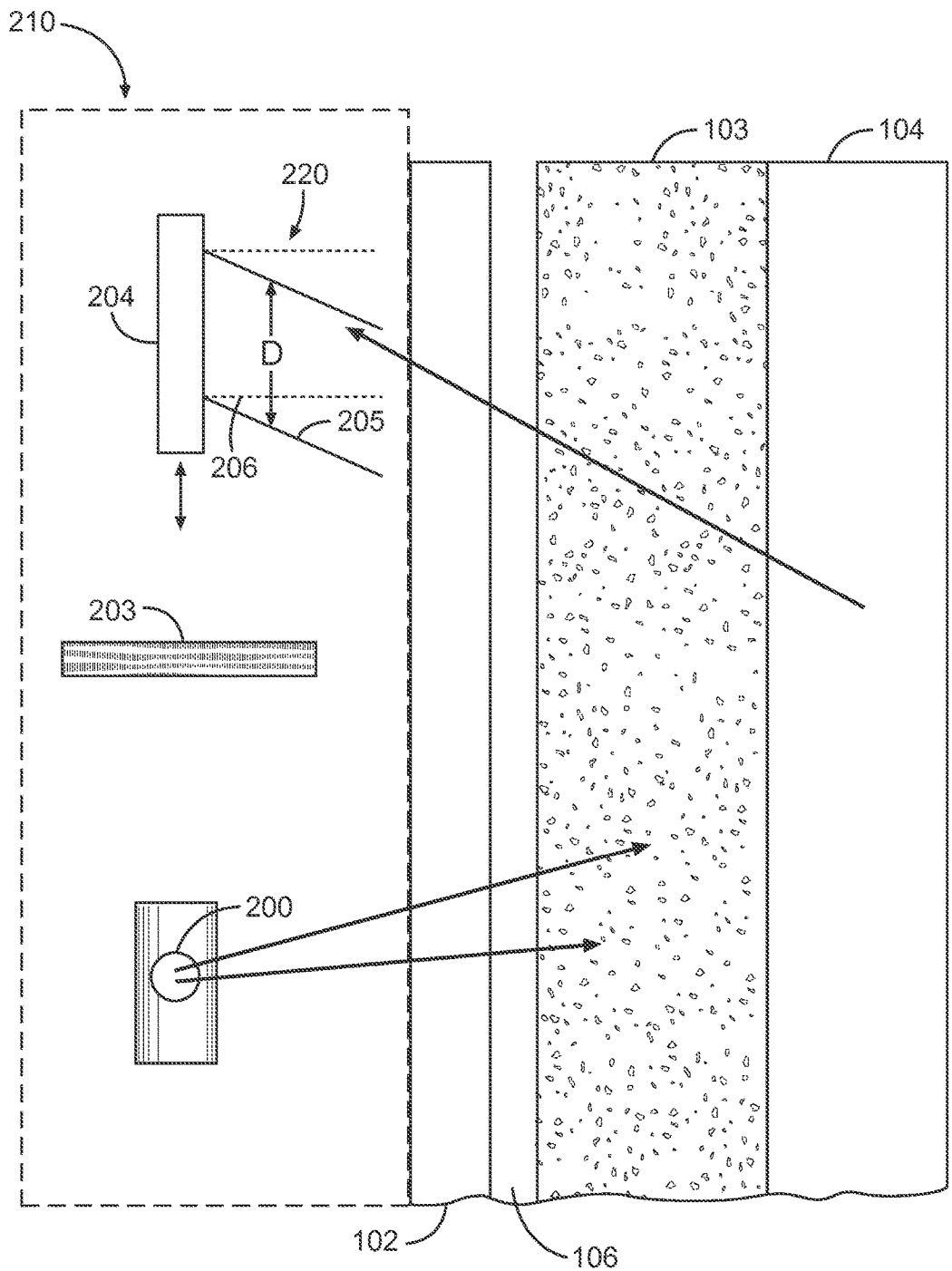
FIG. 2 is a block diagram showing a radioactive source and detector logging tool within the cased hole, according to various examples of the disclosure.

FIG. 2 is a block diagram showing a radioactive source and detector logging tool 210 within the cased hole, according to various examples of the disclosure. The logging tool 210 uses photons transmitted from a radioactive source 200 (e.g., chemical gamma) to penetrate the casing material 102, cement 103 and formation 104, with reflections back to a detector 204 to generate spectra (e.g., FIGS. 3-5) associated with the cement 103 and possible gaps 106 behind the casing 102 and inside the cement 103. The logging tool 210 may be located in a drill string tool housing to be used during a logging while drilling (LWD)/measurement while drilling (MWD) operation (see FIG. 7) or a wireline tool housing to be used during a wireline logging operation (see FIG. 8).

The logging tool 210 includes the radioactive source 200 for generating the photon beam. The radioactive source 200 may comprise any monochromatic high energy photon source, including gamma ray source (e.g., caesium-137). Heat generated by source operation may be dissipated through cooling fluid (e.g., air, water, oil).

The photons in the gamma ray beam interact with the cement 103 which scatters the photons back through the gap material 106 (if any) and the casing 102. The logging tool 210 further comprises one or more gamma ray detectors 204 to detect photons reflected by the cement.

A radiation shield 203 is located between the radioactive source 200 and the detector 204. The shield 203 blocks photons from traveling directly from the source 200 to the detector 204 without passing through the cement 103. The radiation shield 203 may be any photon blocking material (e.g., tungsten, lead) appropriate for blocking high energy photons. The front of the detector 204 is shielded with metal having a relatively high atomic number, such as tungsten, to block photons coming from scattering other than the cement 103. A detector collimator 220 may be cut into the detector shielding to allow the photons scattered behind the casing to pass through. The size (e.g., diameter) D of the detector collimator 220, its relative position to a detector crystal and its angle (if any) relative to the source 200 may determine the amount of gamma ray (i.e., photons) detected by the detector 204. The amount of photons may be represented by the graphs of FIGS. 3-5 as a detection rate (i.e., counts per second).

As discussed subsequently in greater detail, one example of a detector collimator 205 may be angled more towards the source 200 than towards the formation. Another example of a detector collimator 206 may be angled more towards the formation 104 than towards the source 200. Various examples of the detector collimator 220 may also have various sizes D in order to detect desired energy spectra. In order to provide a more desirable formation independence of the detected energy spectra, an energy range may be increased in response to the detector collimator being angled more towards the source. In another example, the energy range may be increased in response to decreasing the diameter of the detector collimator. In either of these examples, the increased energy range may be in the 300 keV to 500 keV range.

As used herein, a detector collimator 205 that is angled more towards the formation comprises having the input of the detector collimator 205 having an angle of approximately 90° with a longitudinal axis of the logging tool. A detector collimator 205 that is angled more towards the source 200 comprises an input of the detector collimator 205 having an included angle of substantially less than 90° with the longitudinal axis of the logging tool.

The distance between the detector 204 and the source 200 may be adjusted, in addition to adjusting the collimator angle and/or the collimator diameter, to detect and evaluate gamma ray energy spectra within an energy range (e.g., <600 keV). The energy spectra are independent of the formation properties (e.g. porosity, density) as indicated by the fact that the spectra are substantially similar (e.g., amplitude and shape) even as the porosity of the formation changes. The graphs of FIGS. 3-5 illustrate the resulting gamma ray energy spectra from varying the various tool design parameters (e.g., detector-to-source distance, collimator angle, collimator diameter).

During a logging operation, the logging tool 210 may be placed against the casing 102 in the wellbore 101 in order to reduce or eliminate any gaps between the tool 210 and the casing 102 that might alter spectral measurements. Photons entering the cement 130 from the source 200 may be reflected back through interaction with cement 103 at certain depths. As the logging tool rotates in the azimuthal direction in the wellbore, the gamma ray interacts with the cement encircling the wellbore 101 at the same depth so that the entire diameter of the cement is investigated as the tool 210 moves through the wellbore 101.

Figure 3:
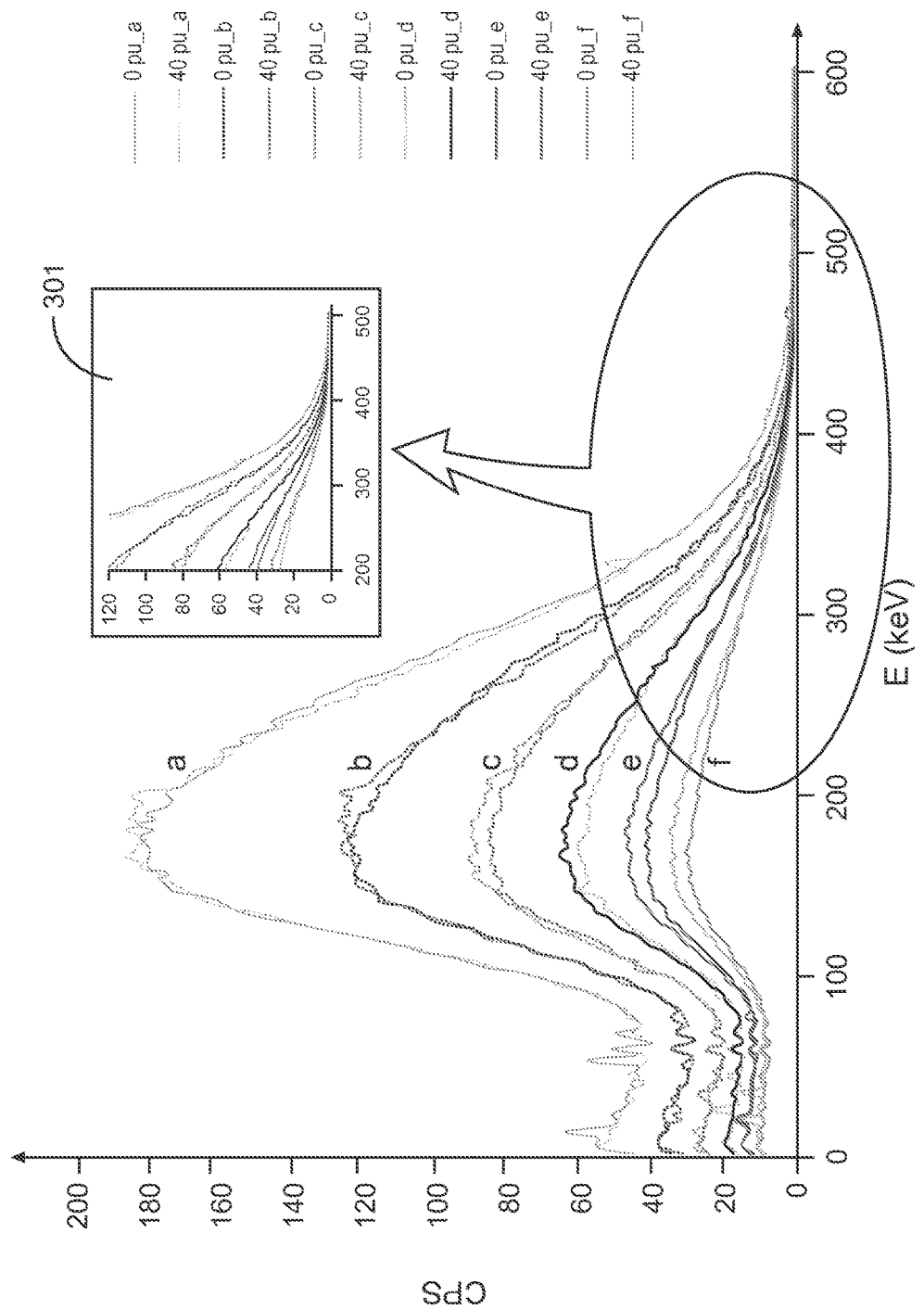
FIG. 3 is a graph showing detected energy spectra associated with good cement from a detector having varying detector-to-source distances with a relatively small size detector collimator, according to various examples of the disclosure.
Figure 4:
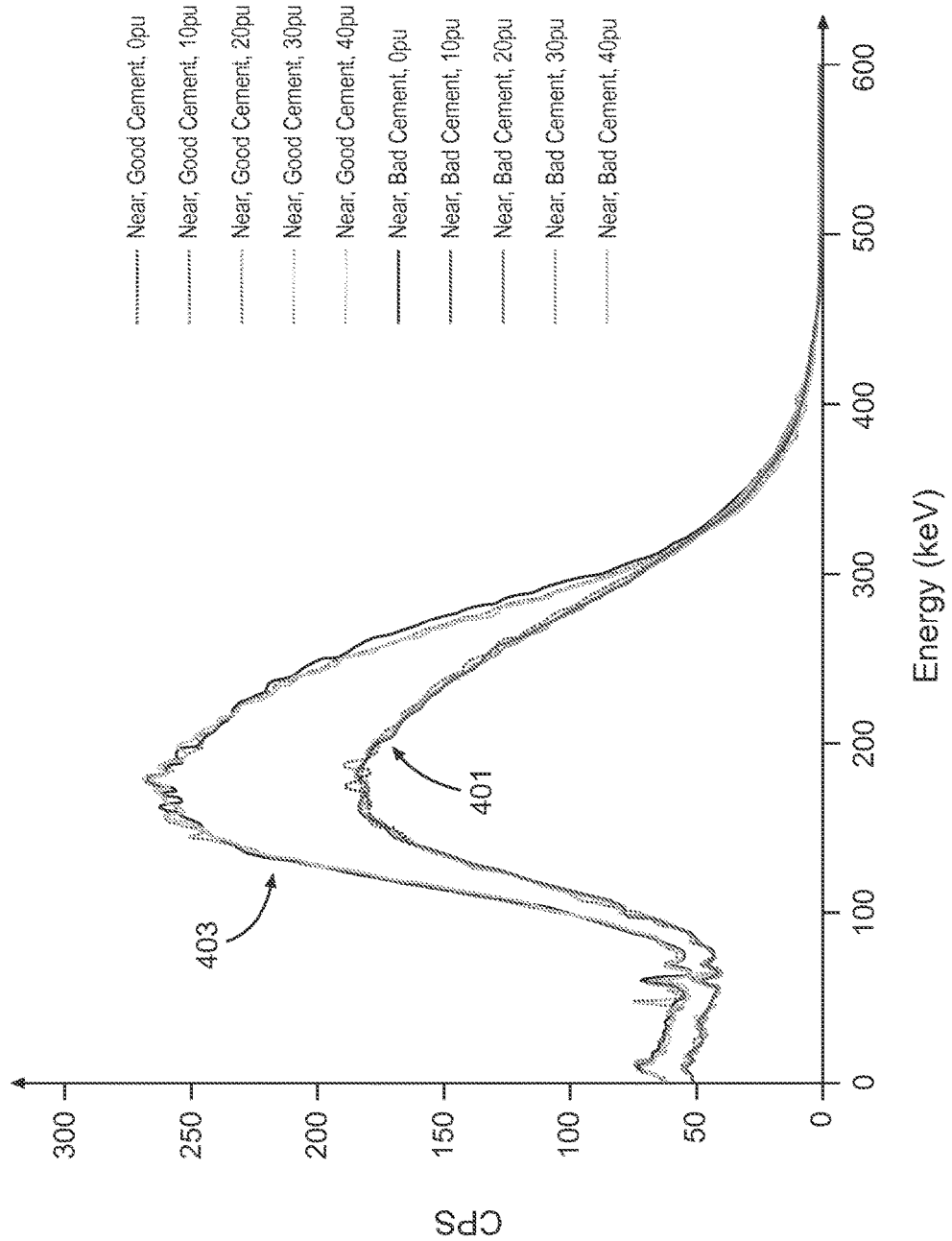
FIG. 4 is a graph showing detected energy spectra associated with good and bad cement from a detector having a relatively close detector-to-source distance, according to various examples of the disclosure.
Figure 5:
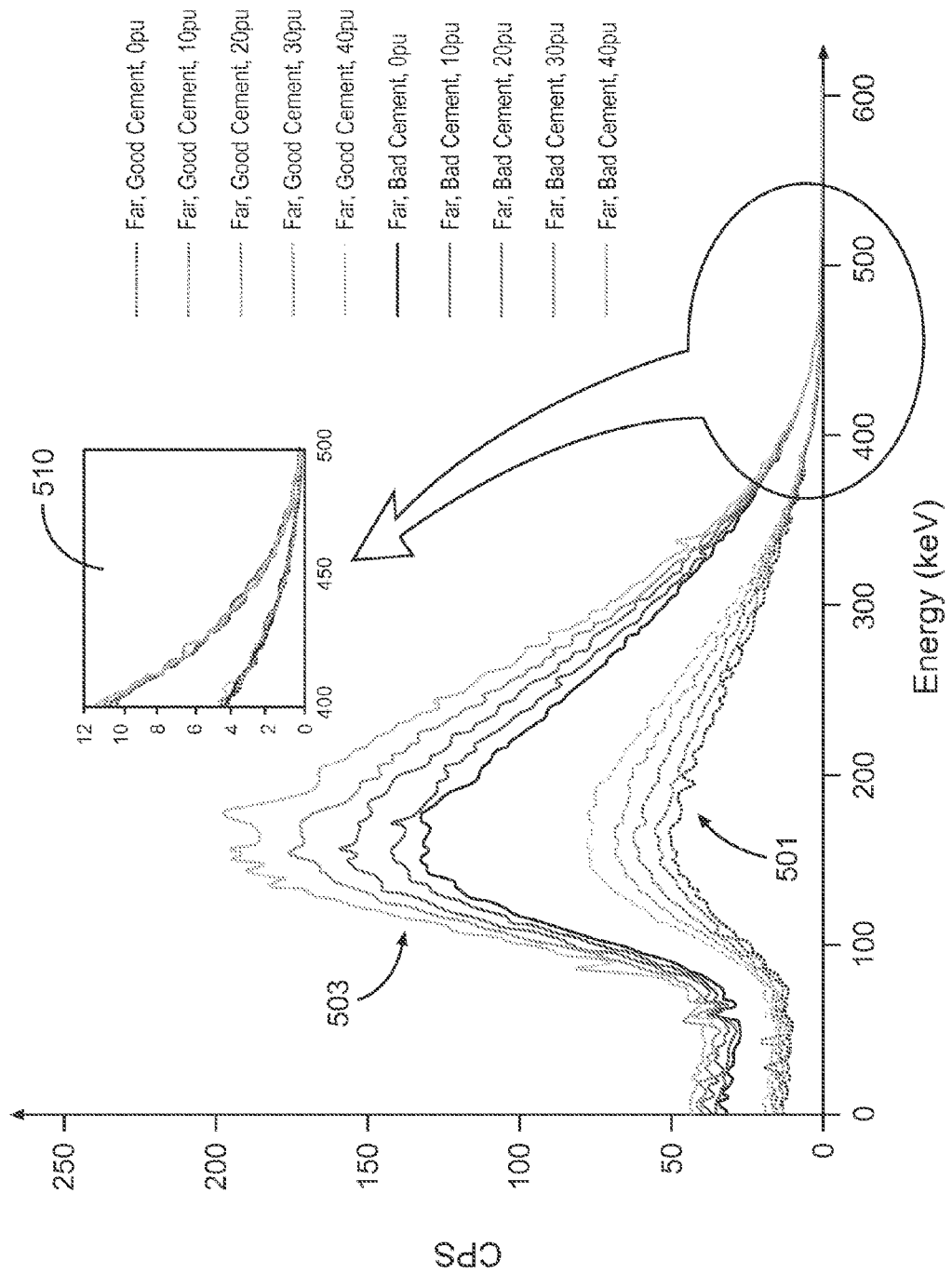
FIG. 5 is a graph showing detected energy spectra associated with good and bad cement from a detector having a relatively large detector-to-source distance, according to various examples of the disclosure.

For purposes of illustration, the graphs of example spectra illustrated in FIGS. 3-5 were generated with a geological formation assumed to be sandstone having a porosity range of 0-40 pu and a density range of 1.99-2.65 grams/cubic centimeter ($g/c^3$). While the subsequent examples refer mostly to formation porosity, this density range may be representative of other formation types having a different porosity. Therefore, the following examples and method for cement evaluation include formation density/mineralogy independence as well as formation porosity independence. Furthermore, the examples and method may be applied to any layered formation structure (e.g., bi-layer structure) wherein the evaluation of the first layer is independent of the properties of the layer behind. Thus, the use of sandstone and the porosity range of 0-40 pu is simply for purposes of illustration.

The following graphs also show different curves associated with "good cement" and "bad cement". As used herein, "good cement" is defined as cement that fully fills the annulus between the casing and the geological formation. "Bad cement" may be defined as water ($H_2O$) or some other fluid replacing the cement filled annulus between the casing and the geological formation.

As described previously, the tool design parameters include detector-to-source spacing, detector collimator size, and detector collimator angle. The optimal tool design parameters increase the spectrum count rates, increase the spectrum sensitivity to cement quality, and decrease the spectrum sensitivity to geological formation properties.

FIG. 3 is a graph showing detected energy spectra associated with good cement from a detector having varying detector-to-source distances with a relatively small diameter detector, according to various examples of the disclosure. The graph shows detected photon energy along the x-axis (in keV) and photon counts per second (cps) along the y-axis.

The spectra of FIG. 3 illustrate the role of detector-to-source spacing on the porosity independent cement evaluation. In order to determine a desirable detector-to-source spacing, the cement quality is kept as an unchanged parameter in generating the graph of FIG. 3. The different formation properties may be represented by the formation porosity (0 pu and 40 pu). A desirable detector-to-source spacing selection has the least sensitivity on formation properties (i.e., the spectra from 0 pu and 40 pu coincides with each other in an energy range as large as possible). The closest detector-to-source position is chosen in such a way that enough shielding can still be placed between the source and the detector to minimize the streaming count rates. This design parameter may be determined by the source strength and tool use. For each simulation to determine the desirable detector-to-source spacing, the detector was set at a different position, represented by a, b, c, d, e, f, with a as the closest, f as the farthest and approximately 38 millimeters (mm) separation between two adjacent positions. Various observations may be made from the spectra FIG. 3. For example, when the detector is relatively close to the source, the energy spectra for the two 40 pu and 0 pu formations are substantially similar. Also, as the detector-to-source spacing increases, the energy range where these two spectra match is reduced. The spectra of FIG. 3 also illustrate that, as the detector-to-source spacing increases, the energy range where the two spectra are substantially similar moves toward relatively higher energy, as illustrated in the relatively higher energy window 301.

The spectra of FIG. 3 illustrate that the detector-to-source spacing determines the energy range where the porosity-independent cement evaluation method may be applied. The farther the detector is from the source, the smaller the formation-porosity independent energy range. However, detector-to-source spacing that is too close may result in the depth of investigation being too small. In other words, the entire range of cement thickness behind casing may not be investigated. Thus a desirable detector-to-source spacing may be indicated by a distance that enables the entire thickness of cement to be investigated while also resulting in a received energy spectra that are substantially similar when the formation properties change.

The spectra illustrated in FIGS. 4 and 5 represent the energy spectra detected at two detector-to-source positions: relatively close and relatively far, respectively. For illustration purposes, the cement quality is chosen to be good and bad as defined previously.

As used herein, a relatively close detector-to-source distance may be defined as a distance that results in a received energy spectra at the detector that responds only to the material filled annulus between the casing and the formation. Thus, no change in the total photon count rate or spectrum shape is observed when the formation porosity changes.

Also as used herein, a relatively large detector-to-source distance may be defined as a distance that results in a received energy spectra at the detector only insensitive to the changes in the formation in a limited range of energy, which is the high energy end of the spectra. Thus, as the formation porosity changes, the received energy spectra does not change within a small energy range as well as indicated by no differences in the received energy spectra within a small energy range.

FIG. 4 is a graph showing detected energy spectra associated with good and bad cement from a detector having a relatively close detector-to-source distance, according to various examples of the disclosure. The graph shows detected photon energy along the x-axis (in keV) and photon cps along the y-axis. This graph represents the energy spectra of a detector-to-source distance that is small relative to the detector-to-source distance represented by the graph of FIG. 4.

Two cement quality groups of curves 401, 403 each represent respective cement qualities (i.e., good cement, bad cement) where each group of curves 401, 403 is associated with the same range of porosity units. For example, the figure shows a first group of curves 401 representing photons detected from good cement, where each curve in that group of curves 401 has a different formation porosity unit value from 0-40 pu. The second group of curves 403 represents photons detected from bad cement, where each curve in that group of curves 403 has a different formation porosity unit value from 0-40 pu.

As seen in FIG. 4, there is a clear difference in the photon count rates between the good cement and the bad cement cases. With the same cement quality (e.g., good, bad), there is no change in the spectra shape or magnitude, over the entire energy range, when the formation porosity changes from 0 pu to 40 pu. The spectra amplitude and shape over the entire illustrated energy range is solely a result of the change in quality of cement and, thus, independent of the formation porosity.

FIG. 5 is a graph showing detected energy spectra associated with good and bad cement from a detector having a relatively large detector-to-source distance, according to various examples of the disclosure. The graph shows detected photon energy along the x-axis (in keV) and photon cps along the y-axis. This graph represents the energy spectra of a detector-to-source distance that is large relative to the detector-to-source distance represented by the graph of FIG. 4 and as defined above.

Two cement quality groups of curves 501, 503 each represent respective cement qualities (i.e., good cement, bad cement) where each group of curves 501, 503 is associated with the same range of porosity units. For example, the figure shows a first group of curves 501 representing photons detected from good cement, where each curve in that group of curves 501 has a different formation porosity unit value from 0-40 pu. The second group of curves 503 represents photons detected from bad cement, where each curve in that group of curves 503 has a different formation porosity unit value from 0-40 pu.

For formations with the same porosity, the count rates are different for good cement and bad cement. As the formation porosity changes, no porosity independence is exhibited over the energy range as is illustrated in the results of the near detector of FIG. 4. However, as seen in the inset plot 510 of FIG. 5, the formation porosity independence is kept in an energy range of approximately 300 keV to approximately 500 keV. Thus, the energy range where the spectra are independent of formation porosity is moved toward the high energy end.

The spectra of FIG. 5 illustrate that the detector-to-source distance determines an energy range where the formation (e.g., porosity) independent cement evaluation method may be applied. The greater the detector-to-source distance, the smaller the formation-porosity independent energy range. And an energy range can always be chosen in such a way that it is insensitive to the formation properties, while its spectra shape and count rates in that range can solely reflect the quality of cement behind the casing.

Varying other tool design parameters may also change the energy range where the detector spectra are independent of the formation porosity. For example, in addition to setting the detector-to-source spacing as described previously, the detector collimator size and angle may be adjusted and set that result in an energy range where the detector spectra response is independent of formation porosity. Within this energy range, the detector spectra response is determined by the cement quality inside the annulus between the casing and formation. By analyzing the total count rates, spectra shape, and spectra amplitude, the cement quality information is obtained.

Figure 6:
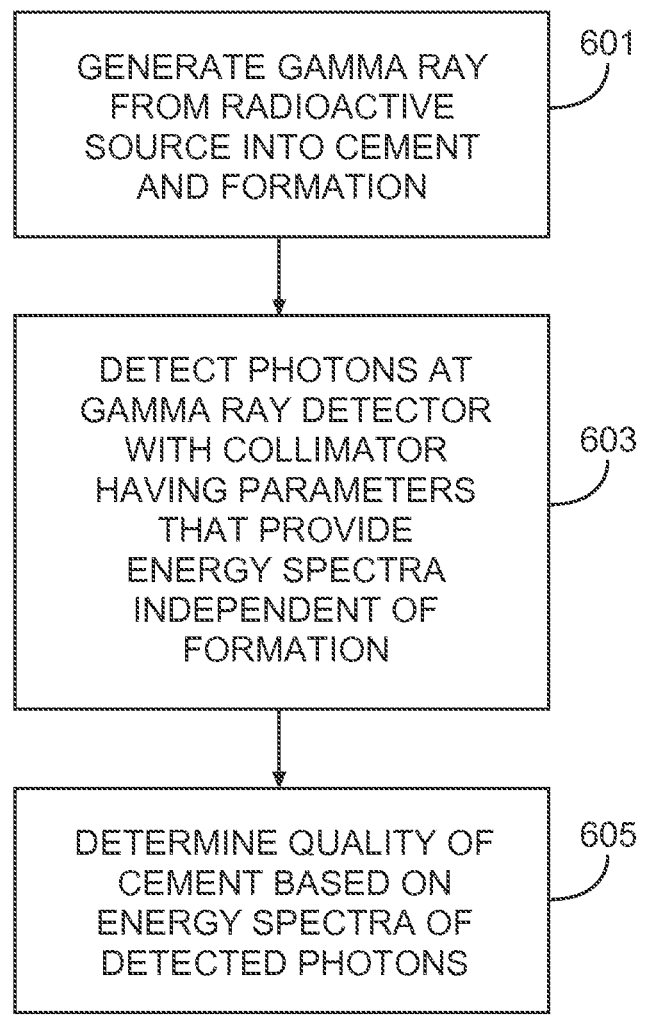
FIG. 6 is a flowchart of a method for performing cement evaluation in a downhole environment, according to various examples of the disclosure.

FIG. 6 is a flowchart of a method for performing cement evaluation in a downhole environment, according to various examples of the disclosure. The method may include, in block 601, generating a gamma ray from a source into the cement disposed in the geological formation. In block 603, photons reflected from the geological formation and the cement, resulting from an interaction of the cement with the gamma-ray, are detected on a detector comprising a collimator such that the tool design parameters (e.g., a detector-to-source distance, a collimator angle, and/or a collimator size) are adjusted to provide an energy spectra independent of the geological formation. For example, the detector-to-source distance is set such that received energy spectra at the detector responds only to the material filled annulus between the casing and the formation. This step may further comprise digitizing the detected count rates of different energy into multichannel spectra, wherein the multichannel spectra are not substantially affected by the geological formation.

In block 605, the quality of the cement is determined based on the energy spectra of the detected photons (e.g., the photon count rate, spectra shape and, spectra amplitude). For example, a relatively lower received photon count rate is an indication of higher cement quality than a relatively higher received photon count rate. In another example, determining the quality of the cement based on the energy spectra of the detected photons may include determining the energy spectra in a range of 300 keV to 500 keV, as noted in the inset 510 of FIG. 5.

Figure 7:
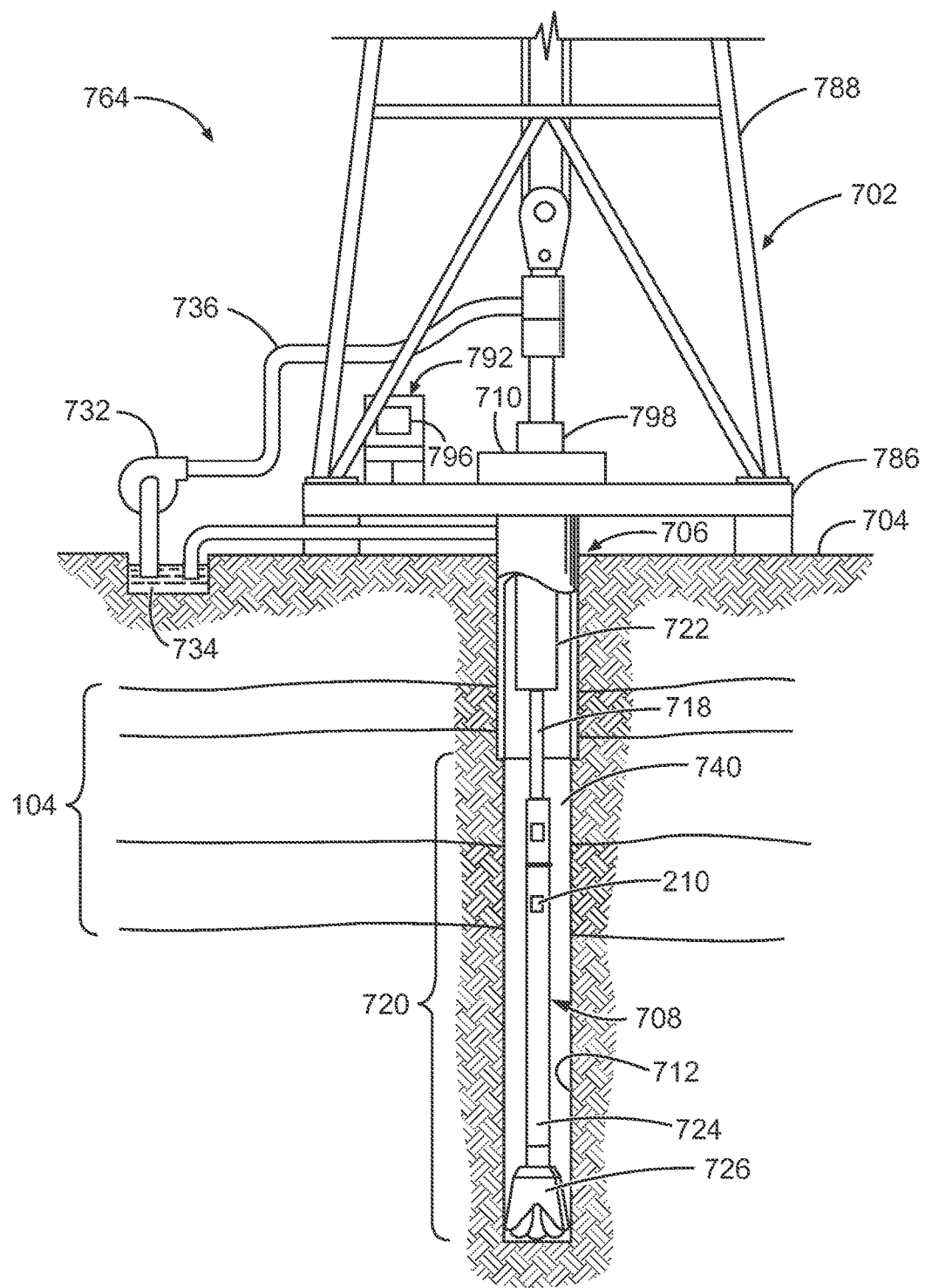
FIG. 7 is a diagram showing a drilling system, according to various examples of the disclosure.

FIG. 7 is a diagram showing a drilling system 764, according to various examples of the disclosure. The system 764 includes a drilling rig 702 located at the surface 704 of a well 706. The drilling rig 702 may provide support for a drillstring 708. The drillstring 708 may operate to penetrate the rotary table 710 for drilling the borehole 712 through the subsurface formations 104. The drillstring 708 may include a drill pipe 718 and a bottom hole assembly (BHA) 720 (e.g., drill string), perhaps located at the lower portion of the drill pipe 718.

The BHA 720 may include drill collars 722, a down hole tool 724 including the logging tool 210, and a drill bit 726. The drill bit 726 may operate to create the borehole 712 by penetrating the surface 704 and the subsurface formations 104. The downhole tool 724 may comprise any of a number of different types of tools besides the logging tool 210. The logging tool 210 may be used in MWD/LWD operations within a borehole 712 that has already been cased with casing and cement. Using the logging tool 210 during the MWD/LWD operations may provide data to the surface (e.g., hardwired, telemetry) on already cased and cemented portions of the borehole 712 as other portions of the borehole 712 are being drilled.

During drilling operations within the cased borehole 712, the drillstring 708 (perhaps including the drill pipe 718 and the BHA 720) may be rotated by the rotary table 710. Although not shown, in addition to or alternatively, the BHA 720 may also be rotated by a motor (e.g., a mud motor) that is located down hole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations within the cased borehole 712, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 712. The drilling fluid may then be returned to the mud pit 734, where such fluid is filtered. In some examples, the drilling fluid can be used to cool the drill bit 726, as well as to provide lubrication for the drill bit 726 during drilling operations. Additionally, the drilling fluid may be used to remove subsurface formation cuttings created by operating the drill bit 726.

A workstation 792 including a controller 796 may include modules comprising hardware circuitry, a processor, and/or memory circuits that may store software program modules and objects, and/or firmware, and combinations thereof that are configured to execute the method of FIG. 7. For example, the workstation 792 with controller 796 may be configured to digitize count rates of different energy into multichannel spectra and generate formation independent energy spectra and use the spectra shape and amplitude to determine cement quality, according to the methods described previously. The controller 796 may be configured to determine a photon count rate, an amplitude, and a shape of the energy spectra in order to determine the quality of the cement.

Thus, in various examples, components of a system operable to conduct high energy photon detection, as described herein or in a similar manner, can be realized in combinations of hardware and/or processor executed software. These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 8:
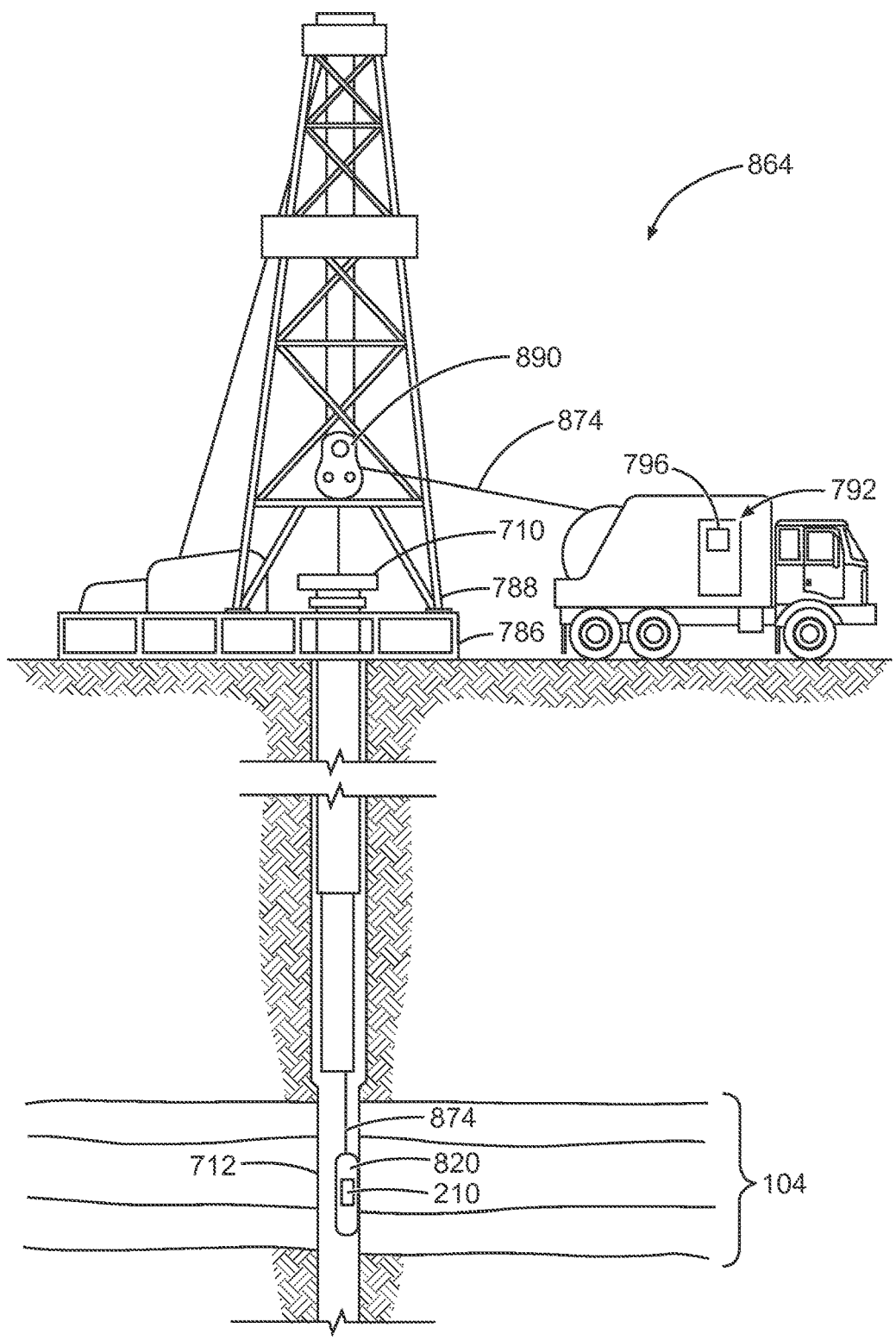
FIG. 8 is a diagram showing a wireline system, according to various examples of the disclosure.

FIG. 8 is a diagram showing a wireline system 864, according to various examples of the disclosure. The system 864 may comprise a wireline logging tool body 820, as part of a wireline logging operation in a cased and cemented borehole 712, that includes the logging tool 210 as described previously.

A drilling platform 786 equipped with a derrick 788 that supports a hoist 890 can be seen. Drilling oil and gas wells is commonly carried out using a string of drill pipes connected together so as to form a drillstring that is lowered through a rotary table 710 into the cased borehole 712. Here it is assumed that the drillstring has been temporarily removed from the borehole 712 to allow the wireline logging tool body 820, such as a probe or sonde with the logging tool 210, to be lowered by wireline or logging cable 874 (e.g., slickline cable) into the borehole 712. Typically, the wireline logging tool body 820 is lowered to the bottom of the region of interest and subsequently pulled upward at a substantially constant speed. In an embodiment, the logging tool 210 is immediately adjacent to the wall of the borehole 712.

During the upward trip, at a series of depths, various instruments may be used to perform quality measurements on the casing and cement lining of the borehole 712, as described previously. The wireline data may be communicated to a surface logging facility (e.g., workstation 792) for processing, analysis, and/or storage. The logging facility 792 may be provided with electronic equipment for various types of signal processing as described previously. The workstation 792 may have a controller 796 that is coupled to the logging tool 210 through the wireline 874 or telemetry in order to receive data from the logging tool regarding the detected photons and generate the energy spectra indicative of the cement quality.

Figure 9:
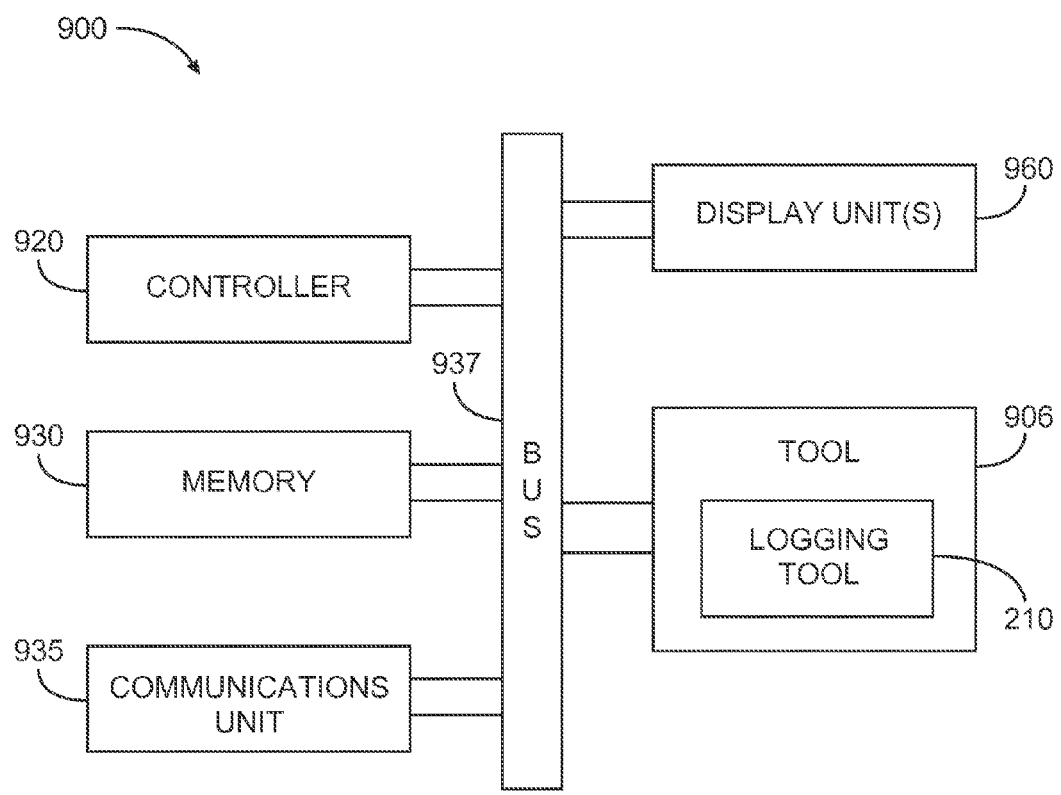
FIG. 9 is a block diagram of an example system operable to implement the activities of multiple methods, according to various examples of the disclosure.

FIG. 9 is a block diagram of an example system 900 operable to implement the activities of multiple methods, according to various examples of the disclosure. The system 900 may include a tool housing 906 having the logging tool 210 such as that illustrated in FIG. 2. The system 900 may be configured to operate in accordance with the teachings herein to perform formation independent cement evaluation measurements in order to determine the quality of cement between the casing and the formation. The system 900 of FIG. 9 may be implemented as shown in FIGS. 7 and 8 with reference to the workstation 792 and controller 796.

The system 900 may include a controller 920, a memory 930, and a communications unit 935. The memory 930 may be structured to include a database. The controller 920, the memory 930, and the communications unit 935 may be arranged to operate as a processing unit to control operation of the logging tool 210 and execute any methods disclosed herein. The processing unit may be configured to digitize detected photon count rates to generate multichannel energy spectra having an amplitude and shape over an energy range that is a result of the change in quality of cement and, thus, independent of the formation.

The communications unit 935 may include downhole communications for appropriately located sensors in a wellbore. Such downhole communications can include a telemetry system. The communications unit 935 may use combinations of wired communication technologies and wireless technologies at frequencies that do not interfere with on-going measurements.

The system 900 may also include a bus 937, where the bus 937 provides electrical conductivity among the components of the system 900. The bus 937 can include an address bus, a data bus, and a control bus, each independently configured or in an integrated format. The bus 937 may be realized using a number of different communication mediums that allows for the distribution of components of the system 900. The bus 937 may include a network. Use of the bus 937 may be regulated by the controller 920.

The system 900 may include display unit(s) 960 as a distributed component on the surface of a wellbore, which may be used with instructions stored in the memory 930 to implement a user interface to monitor the operation of the tool 906 or components distributed within the system 900. The user interface may be used to input parameter values for thresholds such that the system 900 can operate autonomously substantially without user intervention in a variety of applications. The user interface may also provide for manual override and change of control of the system 900 to a user. Such a user interface may be operated in conjunction with the communications unit 935 and the bus 937. Many examples may thus be realized. A few examples of such examples will now be described.

Example 1 is a method for cement evaluation, comprising: generating a gamma ray, from a source, into the cement disposed in a geological formation; detecting, with a detector, photons resulting from gamma ray interactions through casing and the cement; digitizing detected photon count rates of different energy into multichannel energy spectra, wherein a distance between the source and the detector is set such that the multichannel energy spectra are not substantially affected by the geological formation; and determining a quality of the cement based on the multichannel energy spectra.

In Example 2, the subject matter of Example 1 can further include wherein the energy spectra are independent of the geological formation within a predetermined energy range.

In Example 3, the subject matter of Examples 1-2 can further include wherein the energy spectra are independent of a porosity, density or mineralogy of the geological formation.

In Example 4, the subject matter of Examples 1-3 can further include wherein generating the gamma ray comprises generating a photon stream from a caesium-137 source.

In Example 5, the subject matter of Examples 1-4 can further include wherein determining the quality of the cement comprises determining the quality of the cement based on a detected photon count rate, energy spectra shape, or energy spectra amplitude.

In Example 6, the subject matter of Examples 1-5 can further include wherein the detector-to-source distance is set such that the energy spectra responds only to a material filled annulus between the casing and the formation.

In Example 7, the subject matter of Examples 1-6 can further include wherein determining the quality of the cement based on the energy spectra of the detected photons comprises determining the energy spectra in a range of 300 keV to 500 keV.

In Example 8, the subject matter of Examples 1-7 can further include increasing the energy range in response to decreasing the diameter of a detector-collimator.

In Example 9, the subject matter of Examples 1-8 can further include increasing the energy range in response to the collimator being angled more towards the source.

Example 10 is a logging tool comprising: a radioactive source that generates a photon stream; a detector disposed in the tool a distance from the radioactive source, the detector to detect photons resulting from photon interactions through cement disposed in a geological formation; and a controller coupled to the detector to digitize detected photon count rates of different energy into multichannel energy spectra, wherein the distance between the source and the detector is set such that the multichannel energy spectra are not substantially affected by the geological formation, the controller further to determine a quality of the cement based on the multichannel energy spectra.

In Example 11, the subject matter of Example 10 can further include wherein the radioactive source comprises a gamma ray source.

In Example 12, the subject matter of Examples 10-11 can further include a detector collimator coupled to the detector and having an angle toward the radioactive source wherein the detector collimator angle is set such that the energy spectra is independent of the geological formation.

In Example 13, the subject matter of Examples 10-12 can further include wherein the controller determines an amplitude and a shape of the energy spectra to determine the quality of the cement.

In Example 14, the subject matter of Examples 10-13 can further include wherein the controller further determines the quality of the cement based on a detected photon count rate.

Example 15 is a system comprising: a downhole tool including a logging tool, the logging tool comprising: a radioactive source to transmit a photon beam; a detector disposed in the tool a distance from the radioactive source, the detector to detect photons resulting from photon beam interactions through cement in a geological formation; and a controller coupled to the detector to digitize detected photon count rates into multichannel energy spectra, wherein the distance between the source and the detector is set such that the multichannel energy spectra are not substantially affected by the geological formation.

In Example 16, the subject matter of Example 15 can further include wherein the downhole tool is disposed in a wireline tool.

In Example 17, the subject matter of Examples 15-16 can further include wherein the downhole tool is disposed in a drill string tool.

In Example 18, the subject matter of Examples 15-17 can further include wherein the cement is disposed between a casing and the geological formation.

In Example 19, the subject matter of Examples 15-18 can further include wherein the controller is further to determine a quality of the cement in response to the multichannel energy spectra.

In Example 20, the subject matter of Examples 15-19 can further include wherein the controller further determines the quality of the cement based on an amplitude, photon count rates and a shape of the multichannel energy spectra.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. A method for cement evaluation, comprising: generating a gamma ray, from a source, into cement disposed in a geological formation; detecting, with a detector, photons resulting from gamma ray interactions through casing and the cement; digitizing detected photon count rates of different energy into multichannel energy spectra that are independent of the geological formation within an energy range that is modified based on modifying an angle between the detector and the source or modifying the diameter of diameter of a collimator in the detector, wherein a distance between the source and the detector is set such that the multichannel energy spectra are not affected by the geological formation; and determining a quality of the cement based on the multichannel energy spectra.

2. The method of claim 1, wherein the energy spectra are independent of a porosity, density or mineralogy of the geological formation.

3. The method of claim 1, wherein generating the gamma ray comprises generating a photon stream from a caesium-137 source.

4. The method of claim 1, wherein determining the quality of the cement comprises determining the quality of the cement based on a detected photon count rate, energy spectra shape, or energy spectra amplitude.

5. The method of claim 1, wherein a detector-to-source distance is set such that the energy spectra responds only to a material filled annulus between the casing and the formation.

6. The method of claim 1, wherein determining the quality of the cement based on the energy spectra of the detected photons comprises determining the energy spectra in a range of 300 keV to 500 keV.

7. The method of claim 1, wherein the detector is a detector-collimator, said method further comprising increasing the energy range in response to decreasing the diameter of the detector-collimator.

8. The method of claim 1, wherein the detector is a detector-collimator, said method further comprising increasing the energy range in response to the detector-collimator being angled more towards the source.

9. A logging tool comprising: a radioactive source that generates a photon stream; a detector disposed in the tool a distance from the radioactive source, the detector to detect photons resulting from photon interactions through cement disposed in a geological formation; and a controller coupled to the detector to digitize detected photon count rates of different energy into multichannel energy spectra that are independent of the geological formation within an energy range that is modified based on modifying an angle between the detector and the source or modifying the diameter of a collimator in the detector, wherein the distance between the source and the detector is set such that the multichannel energy spectra are not affected by the geological formation, the controller further to determine a quality of the cement based on the multichannel energy spectra.

10. The logging tool of claim 9, wherein the radioactive source comprises a gamma ray source.

11. The logging tool of claim 10, further comprising a detector collimator coupled to the detector and having an angle toward the radioactive source wherein the detector collimator angle is set such that the energy spectra is independent of the geological formation.

12. The logging tool of claim 9, wherein the controller determines an amplitude and a shape of the energy spectra to determine the quality of the cement.

13. The logging tool of claim 12, wherein the controller further determines the quality of the cement based on a detected photon count rate.

14. A system comprising: a downhole tool including a logging tool, the logging tool comprising: a radioactive source to transmit a photon beam; a detector disposed in the tool a distance from the radioactive source, the detector to detect photons resulting from photon beam interactions through cement in a geological formation; and a controller coupled to the detector to digitize detected photon count rates into multichannel energy spectra that are independent of the geological formation within an energy range that is modified based on modifying an angle between the detector and the source or modifying the diameter of a collimator in the detector, wherein the distance between the source and the detector is set such that the multichannel energy spectra are not affected by the geological formation.

15. The system of claim 14, wherein the downhole tool is disposed in a wireline tool.

16. The system of claim 14, wherein the downhole tool is disposed in a drill string tool.

17. The system of claim 14, wherein the cement is disposed between a casing and the geological formation.

18. The system of claim 14, wherein the controller is further to determine a quality of the cement in response to the multichannel energy spectra.

19. The system of claim 18, wherein the controller further determines the quality of the cement based on an amplitude, photon count rates and a shape of the multichannel energy spectra.

* * * * *